(12) United States Patent
Zhao

(10) Patent No.: US 12,120,064 B2
(45) Date of Patent: Oct. 15, 2024

(54) METHOD AND DEVICE FOR TRANSMITTING CONTROL INFORMATION

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 351 days.

(21) Appl. No.: 17/613,901

(22) PCT Filed: May 24, 2019

(86) PCT No.: PCT/CN2019/088437
§ 371 (c)(1),
(2) Date: Nov. 23, 2021

(87) PCT Pub. No.: WO2020/237449
PCT Pub. Date: Dec. 3, 2020

(65) Prior Publication Data
US 2022/0263638 A1  Aug. 18, 2022

(51) Int. Cl.
*H04L 5/00* (2006.01)
*H04L 1/00* (2006.01)
(Continued)

(52) U.S. Cl.
CPC .......... *H04L 5/0092* (2013.01); *H04L 1/0038* (2013.01); *H04L 5/0053* (2013.01);
(Continued)

(58) Field of Classification Search
CPC ......... H04W 72/0446; H04W 72/0453; H04W 72/20; H04L 1/0038; H04L 1/1896; H04L 5/0053; H04L 5/0092
See application file for complete search history.

(56) References Cited

U.S. PATENT DOCUMENTS 11,895,622 B2* 2/2024 Yasukawa ............... H04J 13/18
2020/0106566 A1* 4/2020 Yeo .......................... H04W 28/04
(Continued)

FOREIGN PATENT DOCUMENTS

CN   108633020 A   10/2018
JP   2017516323 A   6/2017

OTHER PUBLICATIONS

Japanese Patent Application No. 2021-568145, Office Action dated Jan. 6, 2023, 3 pages.
(Continued)

*Primary Examiner* — Kashif Siddiqui
(74) *Attorney, Agent, or Firm* — Cozen O'Connor

(57) ABSTRACT

A method for transmitting control information, for a control information transmitting terminal. The control information includes a first part of control information and a second part of control information. The method includes the following. The first part of control information is transmitted to a control information receiving terminal through a first physical layer channel occupying a first time-frequency resource. First indication information is transmitted to the control information receiving terminal, the first indication information being configured to indicate a size of a second time-frequency resource and the second time-frequency resource being configured to be occupied when transmitting the second part of control information. The second part of control information is transmitted to the control information receiving terminal through a second physical layer channel occupying the second time-frequency resource.

18 Claims, 11 Drawing Sheets

--- adding the first indication information into the first part of control information — 310 transmitting the first part of control information carrying the first indication information to the control information receiving terminal through the first physical layer channel occupying the first time-frequency resource — 320

(51) Int. Cl.
H04W 72/0446 (2023.01)
H04W 72/0453 (2023.01)
H04W 72/20 (2023.01)
(52) U.S. Cl.
CPC ... *H04W 72/0446* (2013.01); *H04W 72/0453* (2013.01); *H04W 72/20* (2023.01)

(56) References Cited

U.S. PATENT DOCUMENTS

2020/0236667 A1* 7/2020 Kwak ............... H04W 72/20
2020/0260472 A1* 8/2020 Ganesan ........... H04W 72/20
2020/0305126 A1* 9/2020 Li .................. H04L 1/1614

OTHER PUBLICATIONS

Japanese Patent Application No. 2021-568145, English translation of Office Action dated Jan. 6, 2023, 3 pages.
Mediatek Inc. "On sidelink physical layer structure" 3GPP TSG RAN WG1 Ad-Hoc Meeting 1901, R1-1900196, Jan. 2019, 11 pages.
Huawei et al. "Design and contents of PSCCH and PSFCH" 3GPP TSG RAN WG1 Meeting #97, R1-1906596, May 2019, 13 pages.
Korean Patent Application No. 10-2021-7040420, Office Action dated Oct. 4, 2023, 4 pages.
Korean Patent Application No. 10-2021-7040420, English translation of Office Action dated Oct. 4, 2023, 4 pages.
Interdigital Inc. "Discussion on Physical Layer Structure for NR V2X Sidelink" 3GPP TSG RAN WG1 #97, R1-1907091, May 2019, 13 pages.
Ericsson "PHY layer structure for NR sidelink" 3GPP TSG RAN WG1 Meeting 97, R1-1907134, May 2019, 19 pages.
European Patent Application No. 19930611.9 extended Search and Opinion dated May 13, 2022, 10 pages.
Ericsson "On2-stage PSCCH design" 3GPP TSG-RAN WG1 Meeting #95; R1- 1813648; Nov. 2018; 4 pages.
Mediatek Inc. "Discussion on sidelink physical layer structure" 3GPP TSG RAN WG1 #97; RI-1906553; May 2019; 16 pages.
PCT/CN2019/088437 English translation of the International Search Report dated Feb. 14, 2020, 2 pages.
Interdigital Inc. "On Physical Layer Structure for Nr V2X Sidelink" 3GPP TSG RAN WG1 #96bis, R1-1905400, Apr. 2019, 12 pages.
Spreadtrum Communications "Discussion on physical layer structure for sidelink" 3GPP TSG RAN WG1 #96bis, R1-1904793, Apr. 2019, 9 pages.
Korean Patent Application No. 10-2021-7040420, Office Action dated Jun. 25, 2024, 5 pages.
Korean Patent Application No. 10-2021-7040420, English translation of Office Action dated Jun. 25, 2024, 5 pages.

* cited by examiner

METHOD AND DEVICE FOR TRANSMITTING CONTROL INFORMATION

CROSS-REFERENCE TO RELATED APPLICATION

This application is a national phase of International Application No. PCT/CN2019/088437, filed on May 24, 2019, the content of which is hereby incorporated by reference in its entirety.

TECHNICAL FIELD

The disclosure relates to the field of communication technologies, in particular to a method and a device for transmitting control information.

BACKGROUND

Vehicle to Everything (V2X) communication can include Vehicle to Vehicle (V2V) communication, Vehicle to Infrastructure (V2I) communication, Vehicle to Pedestrian (V2P) communication, etc. In related arts, existing cellular communication technologies can support the V2X communication, that is, communication links between terminal devices and base stations in the existing cellular network can be used for communication (uplink/downlink communication). Also, sidelink between devices can be used for communication (sidelink communication). However, Long Term Evolution (LTE) V2X communication can only support some basic security V2X applications. Therefore, to support new V2X services and satisfy new V2X technical requirements, New Radio (NR) V2X communication needs to provide the higher communication rate, the shorter communication delay and the more reliable communication quality.

SUMMARY

To overcome problems in related arts, embodiments of the disclosure provide a method and a device for transmitting control information.

According to a first aspect of embodiments of the disclosure, there is provided a method for transmitting control information, for a control information transmitting terminal. The control information includes a first part of control information and a second part of control information. The method includes the following.

The first part of control information is transmitted to a control information receiving terminal through a first physical layer channel occupying a first time-frequency resource.

First indication information is transmitted to the control information receiving terminal, the first indication information being configured to indicate a size of a second time-frequency resource and the second time-frequency resource being configured to be occupied when transmitting the second part of control information.

The second part of control information is transmitted to the control information receiving terminal through a second physical layer channel occupying the second time-frequency resource.

According to a second aspect of embodiments of the disclosure, there is provided a method for transmitting control information, for a control information receiving terminal. The control information includes a first part of control information and a second part of control information. The method includes the following.

The first part of control information is received, on a first time-frequency resource, from a control information transmitting terminal through a first physical layer channel.

First indication information is received from the control information transmitting terminal, the first indication information being configured to indicate a size of a second time-frequency resource and the second time-frequency resource being configured to be occupied when transmitting the second part of control information.

The second part of control information is received, on the second time-frequency resource, from the control information transmitting terminal through a second physical layer channel.

According to a third aspect of embodiments of the disclosure, there is provided a non-transitory computer-readable storage medium. The non-transitory computer-readable storage medium has stored therein a computer program. The computer program is configured to perform the method for transmitting control information as the first aspect.

According to a fourth aspect of embodiments of the disclosure, there is provided a non-transitory computer-readable storage medium. The non-transitory computer-readable storage medium has stored therein a computer program. The computer program is configured to perform the method for transmitting control information as the second aspect.

According to a fifth aspect of embodiments of the disclosure, there is provided a device for transmitting control information, for a control information receiving terminal. The control information includes a first part of control information and a second part of control information.

The device includes a processor; and a memory for storing instructions executable by the processor.

The processor is configured to perform the following.

The first part of control information is transmitted to a control information receiving terminal through a first physical layer channel occupying a first time-frequency resource.

First indication information is transmitted to the control information receiving terminal, the first indication information being configured to indicate a size of a second time-frequency resource and the second time-frequency resource being configured to be occupied when transmitting the second part of control information.

The second part of control information is transmitted to the control information receiving terminal through a second physical layer channel occupying the second time-frequency resource.

According to a sixth aspect of embodiments of the disclosure, there is provided a device for transmitting control information, for a control information receiving terminal. The control information includes a first part of control information and a second part of control information.

The device includes a processor; and a memory for storing instructions executable by the processor.

The processor is configured to perform the following.

The first part of control information is received, on a first time-frequency resource, from a control information transmitting terminal through a first physical layer channel.

First indication information is received from the control information transmitting terminal, the first indication information being configured to indicate a size of a second time-frequency resource and the second time-frequency resource being configured to be occupied when transmitting the second part of control information.

The second part of control information is received, on the second time-frequency resource, from the control information transmitting terminal through a second physical layer channel.

It is to be understood that both the foregoing general description and the following detailed description are exemplary and explanatory only and are not restrictive of the disclosure.

BRIEF DESCRIPTION OF THE DRAWINGS

The accompanying drawings herein, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information may not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

Figure 1:
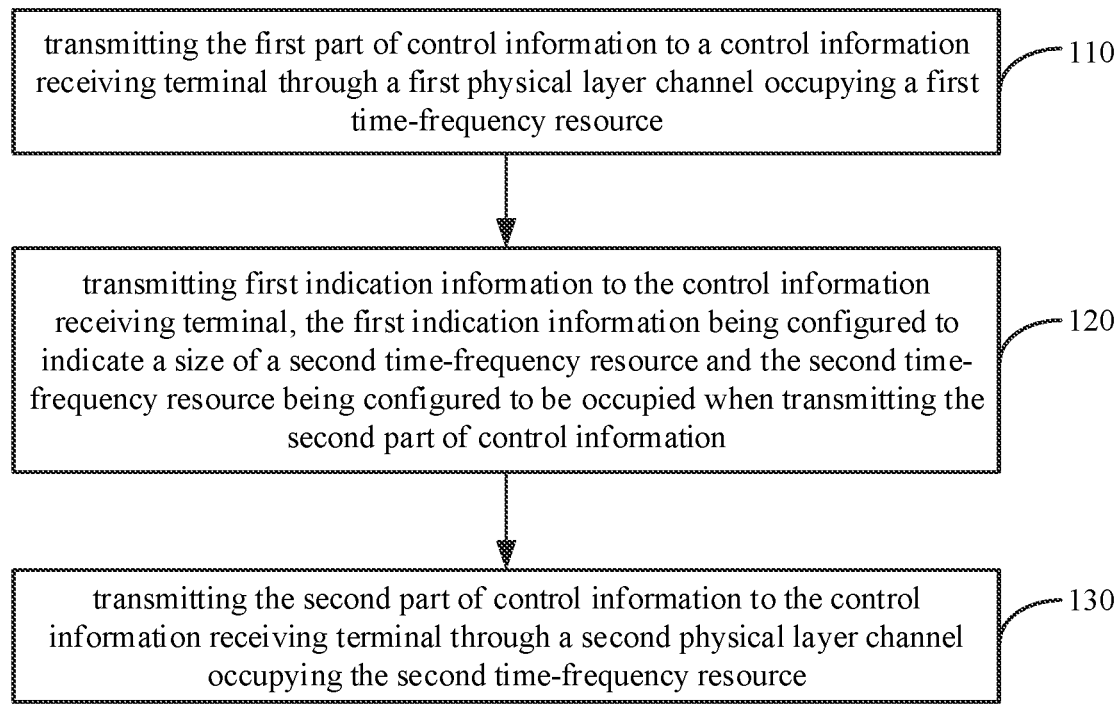
FIG. 1 is a flowchart of a method for transmitting control information according to an exemplary embodiment.
Figure 2:
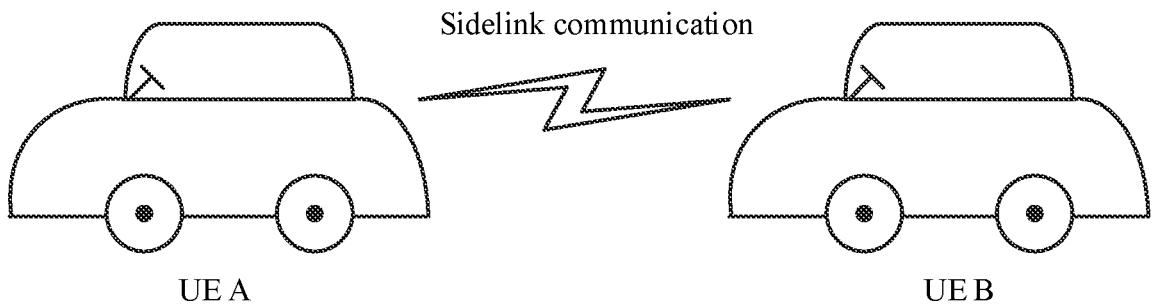
FIG. 2 is a schematic diagram of a scenario of a method for transmitting control information according to an exemplary embodiment.

FIG. 1 is a flowchart of a method for transmitting control information according to an exemplary embodiment. FIG. 2 is a schematic diagram of a scenario of a method for transmitting control information according to an exemplary embodiment. The method for transmitting control information is applicable to a control information transmitting terminal in sidelink communication. The control information includes a first part of control information and a second part of control information. As illustrated in FIG. 1, the method for transmitting control information can include the following 110-130.

In 110, the first part of control information is transmitted to a control information receiving terminal through a first physical layer channel occupying a first time-frequency resource.

In some embodiments of the disclosure, a size of the first part of control information can be fixed and a size of the second part of control information may not be fixed. The first physical layer channel can be a physical sidelink control channel (PSCCH). That is, the control information transmitting terminal can transmit the first part of control information through the PSCCH. Correspondingly, when the control information receiving terminal receives the first part of control information on the PSCCH, blind detection is required.

In related arts, to support unicast and multicast services of sidelink communication to use a physical layer retransmission mechanism of hybrid automatic repeat request (HARQ), additional HARQ related information should be included in sidelink control information (SCI) that is transmitted from the control information transmitting terminal to the control information receiving terminal, for example, HARQ process ID, physical layer source ID, new data indicator (NDI), redundancy version (RV), etc. For broadcast communication, since HARQ is not supported, the control information may not be required. Since the Internet of Vehicles service needs to support unicast, multicast, and broadcast services at the same time, control information of inconsistent sizes will appear in the Internet of Vehicles communication. However, for control information with inconsistent sizes, if the same modulation and coding mode is used for transmission, time-frequency resources of different sizes will be occupied, which will increase the complexity of blind detection.

Therefore, in some embodiments of the disclosure, in order to avoid the occurrence of control information with inconsistent sizes, the control information transmitting terminal can divide the control information into two parts for transmission, namely the first part of control information and the second part of control information. A size of the first part of control information is fixed and a size of the second part of control information is not fixed. Therefore, the size of the first part of control information is the same regardless of unicast, multicast, or broadcast, while the size of the second part of control information is inconsistent (for example, the broadcast may not have the second part of control information). For the control information receiving terminal, the reception of the first part of control information requires blind detection. The reception of the second part of control information may not require blind detection but is realized by the size of the second time-frequency resource that is occupied for transmitting the second part of control information and indicated by the first indication information. The complexity of blind detection at the control information receiving terminal can be reduced.

The first part of control information can include shared information and information related to user perception, such as modulation and coding scheme (MCS), location of frequency resource (for example, lowest physical resource block (PRB)) used for physical sidelink shared channel (PSSCH) transmission, size of lowest PRB, information related PSSCH transmission time (it can also be hidden or fixed and no indication is required), information related blind retransmission, and information related resource occupation (such as indicating future resource occupation). In addition, a target address can also be put in the first part of control information.

The second part of control information can include additional control information. In some embodiments, in order to support HARQ, the second part of control information can include HARQ related information and the first part of control information may not include HARQ related information. This ensures that HARQ is supported and the occurrence of the first part of control information with the inconsistent sizes can be avoided.

In 120, first indication information is transmitted to the control information receiving terminal. The first indication information is configured to indicate the size of the second time-frequency resource and the second time-frequency resource is configured to be occupied when transmitting the second part of control information.

In some embodiments of the disclosure, for the second part of control information, it is possible, like the first part of control information, to use the control channel, namely PSCCH, for transmission, or it is possible to use the data channel, namely PSSCH, for transmission together with data. Therefore, before the control information transmitting terminal transmits the second part of control information, it needs to notify the control information receiving terminal of the size of the second time-frequency resource occupied by transmission of the second part of control information, through the first indication information, which is convenient for the control information receiving terminal to determine the size of the second time-frequency resource based on the first indication information and to receive the second part of control information on the second time-frequency resource.

There are many factors that affect the size of the second time-frequency resource. For example, when the second part of control information and data are transmitted together using the data channel, namely PSSCH, the factors affecting the size of the second time-frequency resource can include but are not limited to at least one of the following: (1) the number of information bits of the second part of control information; (2) a size of a time-frequency resource of the PSSCH; (3) a modulation and coding mode when the data is transmitted using the PSSCH; (4) the number of bits when the data is transmitted using the PSSCH.

In some embodiments, before 120, the method can further include the following.

(1-1) The size of the second time-frequency resource is calculated based on a first parameter.

(1-2) The first indication information is determined based on a value of the first parameter.

In some embodiments, the size of the second time-frequency resource in (1-1) can be proportional to the value of the first parameter in (1-2).

In some embodiments, the first parameter in (1-1) can include a modulation and coding efficiency of the second part of control information.

In some embodiments, the second physical layer channel for transmitting the second part of control information is a physical layer channel for data transmission; and the first parameter in (1-1) can include a parameter for adjusting a ratio of coding efficiencies of the second part of control information and data information.

For example, a modulation and coding mode of the second part of control information is pre-defined or pre-configured, such as quadrature phase shift keying (QPSK) modulation and 1/3 code rate; and then the number of time-frequency units (that is, the size of the second time-frequency resource) that needs to be occupied in the given modulation and encoding mode can be calculated based on the number of information bits of the second part of control information (after channel coding).

For another example, a modulation mode of the second part of control information is pre-defined such as QPSK modulation; a coding efficiency of the second part of control information is related to the number of information bits of the data scheduled for transmission in the PSSCH; it is assumed that the number of time-frequency units occupied by data or the second part of control information in the PSSCH is K, the number of bits of data before channel coding is M, and the number of bits of the second part of control information is N, then the number of time-frequency units occupied by the second part of control information (that is, the size of the second part of control information) is proportional to K, inversely proportional to M, and proportional to N. The implementation process is shown in formula (1).

$$Kc = K \times \left(\frac{N}{N+M}\right) \times C \text{ or } Kc = K \times \left(\frac{N}{M}\right) \times C \qquad \text{formula (1)}$$

In the formula (1), K is the number of time-frequency units available for data or the second part of control information in the PSSCH, N is the number of bits of the second part of control information, M is the number of bits of data before channel coding, C is other parameters that can affect the number of time-frequency units occupied by the second part of control information.

For another example, multiple possible modulation and coding modes for the second part of control information can be defined and the information field in the first part of control information is used to indicate which modulation and coding mode is used. For example, the first part of control information includes 2 bits of information, which can indicate 4 possible modulation and coding modes; or, some information fields in the first part of control information implicitly indicate which modulation and coding mode is to be used, such as, when the MCS field indicates that the data modulation and coding mode is QPSK, the second part of control information uses modulation and coding mode 1, and when the MCS field indicates that the data modulation and coding mode is 16QAM (Quadrature Amplitude Modulation), the second part of control information uses modulation and coding mode 2, and the like.

For another example, alpha (i.e. the first parameter) that adjusts the ratio of the coding efficiencies of the second part of control information and the data information can be defined. The value of the first parameter can be one of {1, 1.2, 1.4 . . . }. The number of time-frequency units occupied by the second part of control information (that is, the size of the second time-frequency resource) is proportional to the value of alpha. The implementation process is shown in formula (2). The first indication information is 3-bit information, which can indicate values of 8 first parameters. Correspondingly, the control information receiving terminal can also use the same manner to calculate the number of time-frequency units occupied by the second time-frequency resource (that is, the size of the second time-frequency resource).

$$Kc = K \times \left(\frac{N}{N+M}\right) \times \text{alpha} \text{ or } Kc = K \times \left(\frac{N}{M}\right) \times \text{alpha} \quad \text{formula (2)}$$

In the formula (2), K is the number of time-frequency units available for data or the second part of control information in the PSSCH, N is the number of bits of the second part of control information, M is the number of bits of data before channel coding, alpha is the parameter that adjusts the ratio of the coding efficiencies of the second part of control information and the data information.

In some embodiments, when (1-2) is performed, the value of the first parameter in the downlink signaling configuration of the base station or the value of the first parameter included in the pre-configuration can be used to implement. The implementation process can include the following.

(2-1) Downlink signaling configuration of the base station is received and the first indication information is determined using the value of the first parameter indicated in the downlink signaling configuration.

Or, (2-1) the first indication information is determined using the value of the first parameter indicated in pre-configuration.

In some embodiments, when (1-2) is performed, the first mapping relationship in the downlink signaling configuration of the base station or the second mapping relationship included in the pre-configuration can be used to implement. The implementation process can include the following.

(3-1) Downlink signaling configuration of the base station is received, a first mapping relationship between the value of the first parameter and the first indication information is obtained, and the first indication information is determined using the first mapping relationship.

Or, (3-2) a second mapping relationship between the value of the first parameter and the first indication information in pre-configuration is obtained and the first indication information is determined using the second mapping relationship.

In 130, the second part of control information is transmitted to the control information receiving terminal through a second physical layer channel occupying the second time-frequency resource.

In some embodiments of the disclosure, it is possible, like the first part of control information, for the second part of control information, to use the control channel, namely PSCCH, for transmission, or it is possible to use the data channel, namely PSSCH, for transmission together with the data. Therefore, the second physical layer channel used to transmit the second part of control information can be the PSCCH or the PSSCH. In other words, the first physical layer channel in 110 and the second physical layer channel in 130 can be the same or different.

In addition, for the control information transmitting terminal, 110, 120, and 130 can be in parallel and there is no strict temporal relationship. Therefore, the disclosure does not limit the execution sequence among 110, 120, and 130.

In a scenario, as illustrated in FIG. 2, UE (User Equipment) A and UE B are included. UE A is used to characterize the control information transmitting terminal and UE B is used to characterize the control information receiving terminal.

UE A can transmit the first part of control information to UE B through the first physical layer channel occupying the first time-frequency resource; also transmit the first indication information to UE B, in which the first indication information is configured to indicate the size of the second time-frequency resource and the second time-frequency resource is configured to be occupied when transmitting the second part of control information; and transmit the second part of control information to UE B through the second physical layer channel occupying the second time-frequency resource.

Correspondingly, UE B can receive, on the first time-frequency resource, the first part of control information from UE A; also receive the first indication information from UE A, in which the first indication information is configured to indicate the size of the second time-frequency resource and the second time-frequency resource is configured to be occupied when transmitting the second part of control information; and receive, on the second time-frequency resource, the second part of control information from UE A through the second physical layer channel.

It can be seen from the above embodiments that the control information transmitting terminal can transmit the first part of control information to the control information receiving terminal through the first physical layer channel occupying the first time-frequency resource; also transmit the first indication information to the control information receiving terminal, in which the first indication information is configured to indicate the size of the second time-frequency resource and the second time-frequency resource is configured to be occupied when transmitting the second part of control information; and transmit the second part of control information to the control information receiving terminal through the second physical layer channel occupying the second time-frequency resource. Therefore, the control information receiving terminal, without blind detection, can receive the second part of control information based on the indication of the control information transmitting terminal, reducing the complexity of blind detection and improving the communication quality of sidelink communication.

Figure 3:
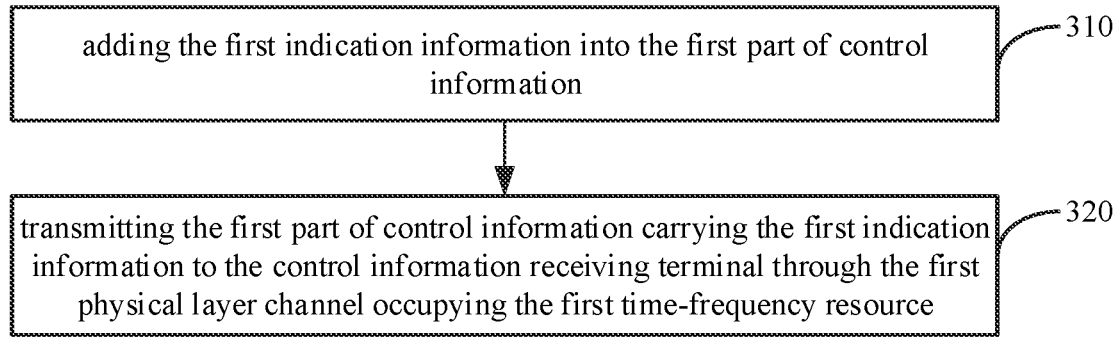
FIG. 3 is a flowchart of another method for transmitting control information according to an exemplary embodiment.

FIG. 3 is a flowchart of another method for transmitting control information according to an exemplary embodiment. The method for transmitting control information is applicable to the control information transmitting terminal in sidelink communication and based on the method in FIG. 1. When 120 is performed, as illustrated in FIG. 3, 310-330 can be included.

In 310, the first indication information is added into the first part of control information.

In some embodiment of the disclosure, the first indication information can be a part of the first part of control information. For example, the first indication information is added into the information field of the first part of control information.

In 320, the first part of control information carrying the first indication information is transmitted to the control information receiving terminal through the first physical layer channel occupying the first time-frequency resource.

In some embodiment of the disclosure, for the first part of control information, the first physical layer channel can be the PSCCH. That is, the control information transmitting terminal can transmit the first part of control information through the PSCCH. Correspondingly, when the control information receiving terminal receives the first part of control information on the PSCCH, blind detection is required.

For the second part of control information, the control information transmitting terminal can transmit the first indication information along with the first part of control information to the control information receiving terminal, so that the control information receiving terminal can obtain the first indication information from the first part of control information, determines the size of the second time-frequency resource based on the first indication information, and receives the second part of control information on the second time-frequency resource.

It can be seen from the above embodiments that when the first indication information is transmitted to the control information receiving terminal, the first indication information can be transmitted to the control information receiving terminal along with the first part of control information, so that the control information receiving terminal can obtain the first indication information from the first part of control information, determine the size of the second time-frequency resource based on the first indication information, and receive the second part of control information on the second time-frequency resource, thereby improving the accuracy of control information indication and improving the reliability that the control information receiving terminal receives the second part of control information.

Figure 4:
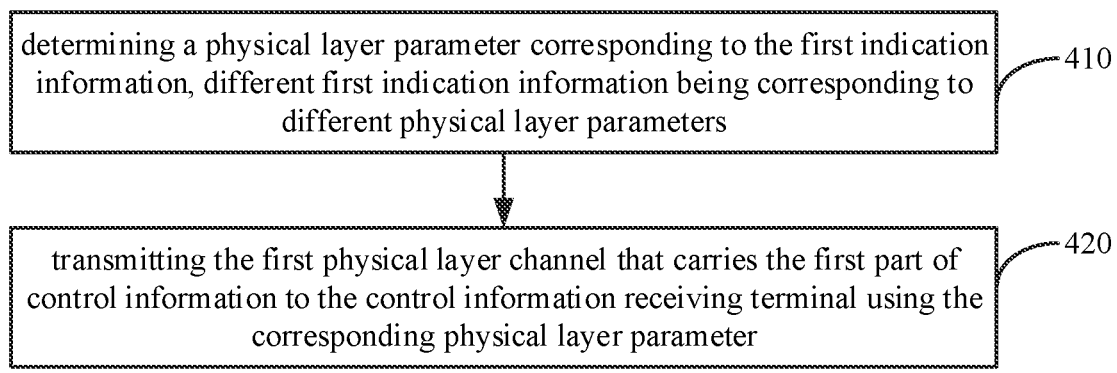
FIG. 4 is a flowchart of another method for transmitting control information according to an exemplary embodiment.

FIG. 4 is a flowchart of another method for transmitting control information according to an exemplary embodiment. The method for transmitting control information is applicable to the control information transmitting terminal in sidelink communication and based on the method in FIG. 1. When 120 is performed, as illustrated in FIG. 4, 410-420 can be included.

In 410, a physical layer parameter corresponding to the first indication information is determined, different first indication information being corresponding to different physical layer parameters.

In some embodiments of the disclosure, the physical layer parameter corresponding to the first indication information can be used to implicitly indicate the information content of the first indication information.

In 420, the first physical layer channel that carries the first part of control information is transmitted to the control information receiving terminal using the corresponding physical layer parameter.

In some embodiments of the disclosure, for the first part of control information, the first physical layer channel can be the PSCCH. That is, the control information transmitting terminal can transmit the first part of control information through the PSCCH. Correspondingly, when the control information receiving terminal receives the first part of control information on the PSCCH, blind detection is required.

For the second part of control information, the control information transmitting terminal can use the physical layer parameter used by the first physical layer channel to implicitly indicate the first indication information, so that the control information receiving terminal can detect the physical layer parameter used by the first physical layer channel to determine the first indication information, determine the size of the second time-frequency resource based on the first indication information, and receive the second part of control information on the second time-frequency resource.

In some embodiments, the physical layer parameter corresponding to the first indication information in 410 can include but is not limited to at least one of the following.

(4-1) A demodulation reference signal (DMRS) sequence of the first physical layer channel for transmitting the first part of control information.

(4-2) A transmission format used when transmitting the first part of control information.

It can be seen from the above embodiments that when the first indication information is transmitted to the control information receiving terminal, the physical layer parameter used by the first physical layer channel carrying the first part of control information can be used to implicitly indicate the first indication information. The control information transmitting terminal can determine the first indication information by detecting the physical layer parameter used by the first physical layer channel, determine the size of the second time-frequency resource based on the first indication information, and receive, on the second time-frequency resource, the second part of control information, thereby improving the flexibility of control information indication and improving the efficiency that the control information receiving terminal receives the second part of control information.

Figure 5:
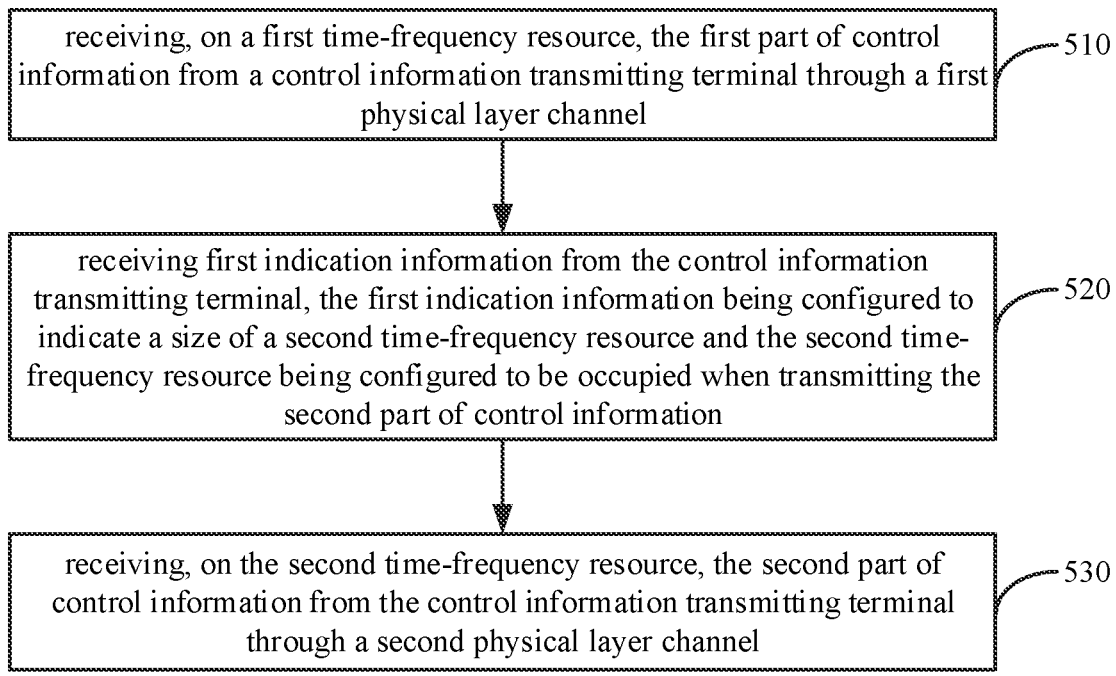
FIG. 5 is a flowchart of a method for transmitting control information according to an exemplary embodiment.

FIG. 5 is a flowchart of a method for transmitting control information according to an exemplary embodiment. The method for transmitting control information is applicable to a control information receiving terminal in sidelink communication. The control information includes a first part of control information and a second part of control information. As illustrated in FIG. 5, the method for transmitting control information can include the following 510-530.

In 510, the first part of control information is received, on a first time-frequency resource, from a control information transmitting terminal, through a first physical layer channel.

In some embodiments of the disclosure, in order to avoid the occurrence of control information with inconsistent sizes, the control information transmitting terminal can divide the control information into two parts for transmission, namely the first part of control information and the second part of control information. A size of the first part of control information can be fixed and a size of the second part of control information may not be fixed. Therefore, the size of the first part of control information is the same regardless of unicast, multicast, or broadcast, while the size of the second part of control information is inconsistent (for example, the broadcast may not have the second part information). For the control information receiving terminal, the reception of the first part of control information requires blind detection. The reception of the second part of control information may not require blind detection but is realized by the size of the second time-frequency resource that is occupied for transmitting the second part of control information and indicated by the first indication information. The complexity of blind detection at the control information receiving terminal can be reduced.

The first physical layer channel used to carry the first part of control information can be the PSCCH. That is, the control information transmitting terminal can transmit the first part of control information through the PSCCH. Correspondingly, when the control information receiving terminal receives the first part of control information on the PSCCH, blind detection is required.

In 520, first indication information is received from the control information transmitting terminal, in which the first indication information is configured to indicate a size of a second time-frequency resource and the second time-frequency resource is configured to be occupied when transmitting the second part of control information.

In some embodiments of the disclosure, for the second part of control information, it is possible, like the first part of control information, to use the control channel, namely PSCCH, for transmission, or it is possible to use the data channel, namely PSSCH, for transmission together with data. Therefore, before transmitting the second part of control information, the control information transmitting terminal needs to notify the control information receiving terminal of the size of the second time-frequency resource occupied by transmission of the second part of control information, through the first indication information. Correspondingly, after receiving the first indication notification, the control information receiving terminal can determine the size of the second time-frequency resource based on the first indication information and receive the second part of control information on the second time-frequency resource.

In some embodiments, after 520, the method further includes the following.

(5-1) A value of a first parameter is determined based on the first indication information.

(5-2) The size of the second time-frequency resource is calculated based on the first parameter.

In some embodiments, the value of the first parameter in (5-1) can be proportional to the size of the second time-frequency resource in (5-2).

In some embodiments, the first parameter in (5-1) can include a modulation and coding efficiency of the second part of control information.

In some embodiments, the second physical layer channel for transmitting the second part of control information is a physical layer channel for data transmission; and the first parameter in (5-1) includes a parameter for adjusting a ratio of coding efficiencies of the second part of control information and data information.

In some embodiments, when (5-1) is performed, the first mapping relationship in the downlink signaling configuration of the base station or the second mapping relationship included in the pre-configuration can be used to implement. The implementation process can include the following.

(6-1) Downlink signaling configuration of the base station is received, a first mapping relationship between the value of the first parameter and the first indication information is obtained, and the value of the first parameter is determined using the first mapping relationship.

Or, (6-2) a second mapping relationship between the value of the first parameter and the first indication information in pre-configuration is obtained and the value of the first parameter is determined using the second mapping relationship.

In 530, the second part of control information is received, on the second time-frequency resource, from the control information transmitting terminal through a second physical layer channel.

In some embodiments of the disclosure, it is possible, like the first part of control information, for the second part of control information, to use the control channel, namely PSCCH, for transmission, or it is possible to use the data channel, namely PSSCH, for transmission together with data. Therefore, the second physical layer channel used to transmit the second part of control information can be the PSCCH or the PSSCH. In other words, the first physical layer channel in 510 and the second physical layer channel in 530 can be the same or different.

It can be seen from the above embodiments that the control information receiving terminal can receive, on the first time-frequency resource, the first part of control information from the control information transmitting terminal through the first physical layer channel; also receive the first indication information from the control information transmitting terminal, in which the first indication information is configured to indicate the size of the second time-frequency resource and the second time-frequency resource is configured to be occupied when transmitting the second part of control information; and receive, on the second time-frequency resource, the second part of control information from the control information transmitting terminal through the second physical layer channel. Therefore, the control information receiving terminal, without blind detection, can receive the second part of control information based on the indication of the control information transmitting terminal, reducing the complexity of blind detection and improving the communication quality of sidelink communication.

Figure 6:
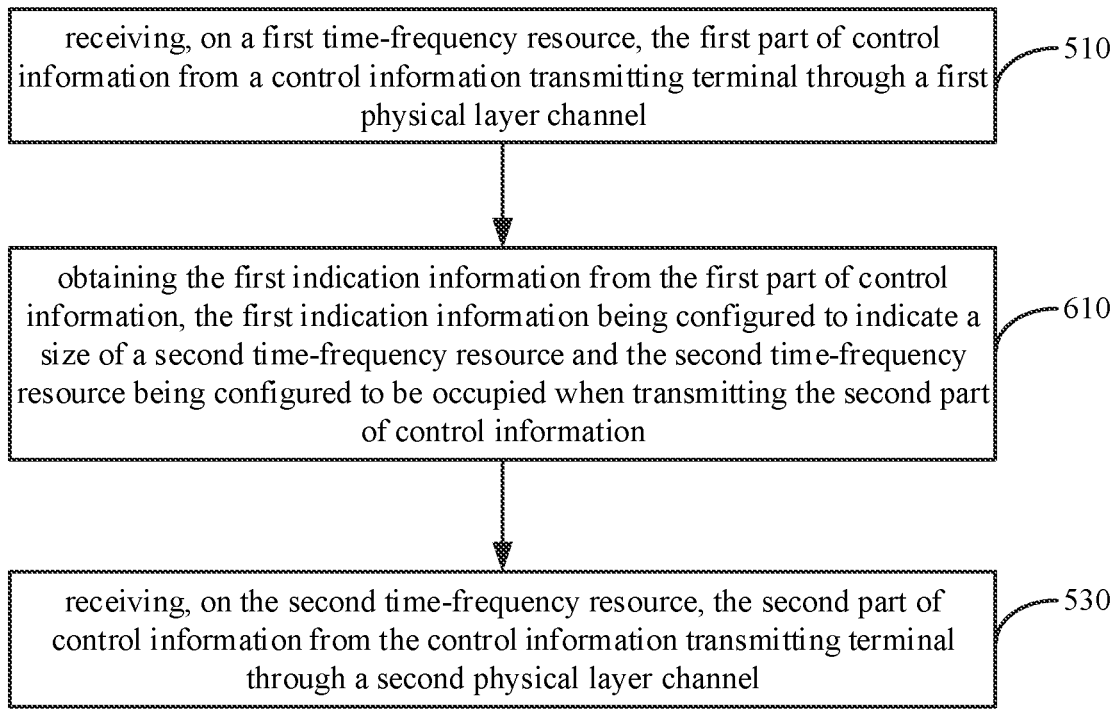
FIG. 6 is a flowchart of another method for transmitting control information according to an exemplary embodiment.

FIG. 6 is a flowchart of another method for transmitting control information according to an exemplary embodiment. The method for transmitting control information is applicable to the control information receiving terminal in sidelink communication and based on the method in FIG. 5. When 520 is performed, as illustrated in FIG. 6, 610 can be included.

In 610, the first indication information is obtained from the first part of control information.

In some embodiment of the disclosure, the first indication information can be a part of the first part of control information. For example, the first indication information is located in the information field of the first part of control information. In addition, since the control information receiving transmitting terminal can transmit the first indication information along with the first part of control information to the control information receiving terminal, the control information receiving terminal can obtain the first indication information from the first part of control information, determine the size of the second time-frequency resource based on the first indication information, and receive the second part of control information on the second time-frequency resource.

It can be seen from the above embodiments that the first indication information can be obtained directly from the first part of control information, the size of the second time-frequency resource can be determined based on the first indication information, and the second part of control information can be received on the second time-frequency resource, thereby improving the accuracy of control information indication and improving the reliability of receiving the second part of control information.

Figure 7:
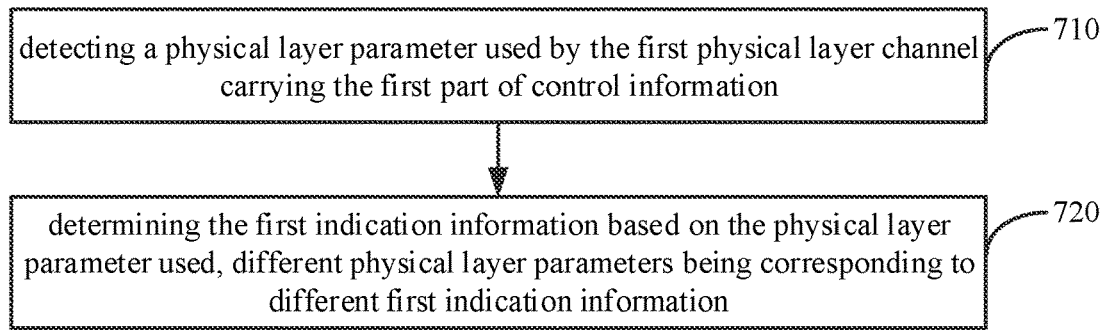
FIG. 7 is a flowchart of another method for transmitting control information according to an exemplary embodiment.

FIG. 7 is a flowchart of another method for transmitting control information according to an exemplary embodiment. The method for transmitting control information is applicable to the control information receiving terminal in sidelink communication and based on the method in FIG. 5. When 520 is performed, as illustrated in FIG. 7, 710-720 can be included.

In 710, a physical layer parameter used by the first physical layer channel carrying the first part of control information, is detected.

In some embodiments of the disclosure, for the first part of control information, the first physical layer channel can be the PSCCH. Moreover, because the control information transmitting terminal can use the physical layer parameter used by the first physical layer channel to implicitly indicate the first indication information, the control information receiving terminal can detect the physical layer parameter used by the first physical layer channel to determine the first indication information, determine the size of the second time-frequency resource based on the first indication information, and receive the second part of control information on the second time-frequency resource.

In some embodiments, the physical layer parameter used by the first physical layer channel in 710 can include but be not limited to at least one of the following.

(7-1) A DMRS sequence of the first physical layer channel for transmitting the first part of control information.

(7-2) A transmission format used when transmitting the first part of control information.

In 720, the first indication information is determined based on the physical layer parameter used, different physical layer parameters being corresponding to different first indication information.

It can be seen from the above embodiments that the first indication information can be determined by detecting the physical layer parameter used by the first physical layer channel, the size of the second time-frequency resource can be determined based on the first indication information, and the second part of control information can be received on the second time-frequency resource, thereby improving the flexibility of control information indication and improving the efficiency of receiving the second part of control information.

Corresponding to the foregoing embodiments of the method for transmitting control information, the disclosure also provides embodiments of a device for transmitting control information.

Figure 8:
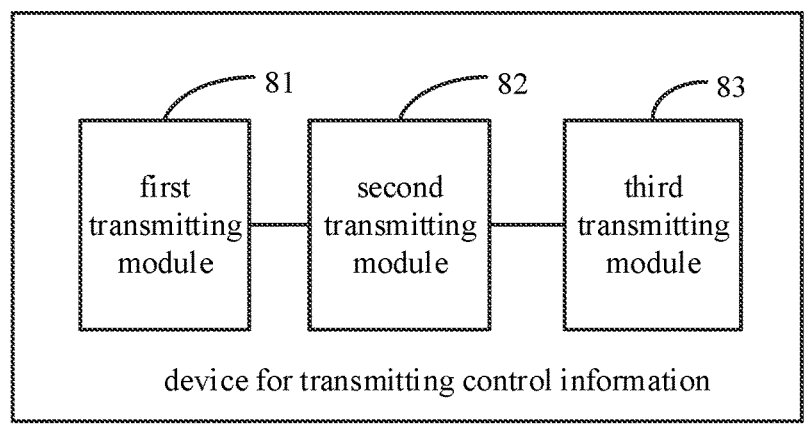
FIG. 8 is a block diagram of a device for transmitting control information according to an exemplary embodiment.

FIG. 8 is a block diagram of a device for transmitting control information according to an exemplary embodiment. The device for transmitting control information is applicable to a control information transmitting terminal in sidelink communication. The control information includes a first part of control information and a second part of control information. As illustrated in FIG. 8, the device for transmitting control information can include a first transmitting module 81, a second transmitting module 82 and a third transmitting module 83.

The first transmitting module 81 is configured to transmit the first part of control information to a control information receiving terminal through a first physical layer channel occupying a first time-frequency resource.

The second transmitting module 82 is configured to transmit first indication information to the control information receiving terminal, the first indication information being configured to indicate a size of a second time-frequency resource and the second time-frequency resource being configured to be occupied when transmitting the second part of control information.

The third transmitting module 83 is configured to transmit the second part of control information to the control information receiving terminal through a second physical layer channel occupying the second time-frequency resource.

It can be seen from the above embodiments that the control information transmitting terminal can transmit the first part of control information to the control information receiving terminal through the first physical layer channel occupying the first time-frequency resource; also transmit the first indication information to the control information receiving terminal, in which the first indication information is configured to indicate the size of the second time-frequency resource and the second time-frequency resource is configured to be occupied when transmitting the second part of control information; and transmit the second part of control information to the control information receiving terminal through the second physical layer channel occupying the second time-frequency resource. Therefore, the control information receiving terminal, without blind detection, can receive the second part of control information based on the indication of the control information transmitting terminal, reducing the complexity of blind detection and improving the communication quality of sidelink communication.

Figure 9:
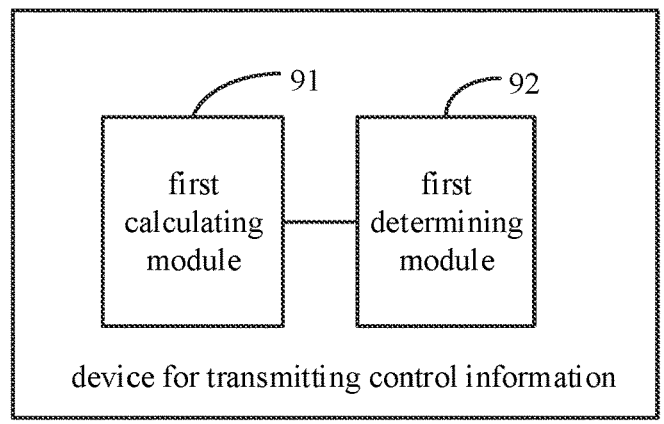
FIG. 9 is a block diagram of another device for transmitting control information according to an exemplary embodiment.

In some embodiments, based on the device in FIG. 8, as illustrated in FIG. 9, the device further includes a first calculating module 91 and a first determining module 92.

The first calculating module 91 is configured to calculate the size of the second time-frequency resource based on a first parameter.

The first determining module 92 is configured to determine the first indication information based on a value of the first parameter.

In some embodiments, based on the device in FIG. 9, the size of the second time-frequency resource is proportional to the value of the first parameter.

In some embodiments, based on the device in FIG. 9, the first parameter includes a modulation and coding efficiency of the second part of control information.

In some embodiments, based on the device in FIG. 9, the second physical layer channel is a physical layer channel for data transmission; and the first parameter includes a parameter for adjusting a ratio of coding efficiencies of the second part of control information and data information.

Figure 10:
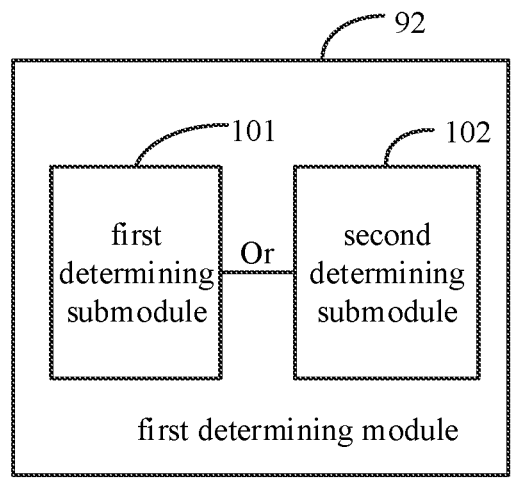
FIG. 10 is a block diagram of another device for transmitting control information according to an exemplary embodiment.

In some embodiments, based on the device in FIG. 9, as illustrated in FIG. 10, the first determining module 92 includes a first determining submodule 101 or a second determining submodule 102.

The first determining submodule 101 is configured to receive downlink signaling configuration of a base station and determine the first indication information using the value of the first parameter indicated in the downlink signaling configuration.

The second determining submodule 102 is configured to determine the first indication information using the value of the first parameter indicated in pre-configuration.

Figure 11:
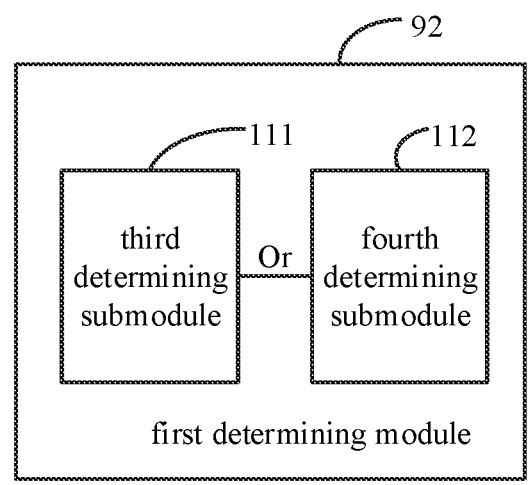
FIG. 11 is a block diagram of another device for transmitting control information according to an exemplary embodiment.

In some embodiments, based on the device in FIG. 9, as illustrated in FIG. 11, the first determining module 92 includes a third determining submodule 111 or a fourth determining submodule 112.

The third determining submodule 111 is configured to receive downlink signaling configuration of a base station, obtain a first mapping relationship between the value of the first parameter and the first indication information, and determine the first indication information using the first mapping relationship.

The fourth determining submodule 112 is configured to obtain a second mapping relationship between the value of the first parameter and the first indication information in pre-configuration and determine the first indication information using the second mapping relationship.

Figure 12:
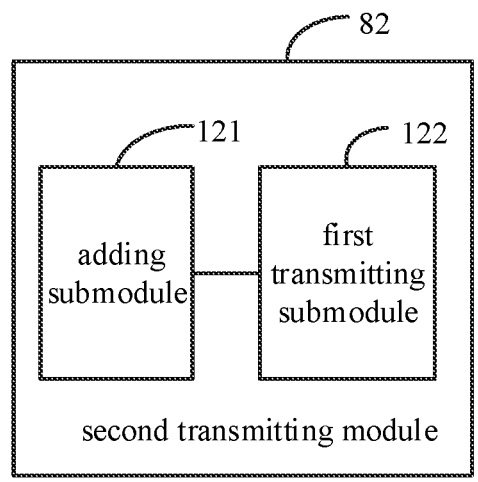
FIG. 12 is a block diagram of another device for transmitting control information according to an exemplary embodiment.

In some embodiments, based on the device in FIG. 8, as illustrated in FIG. 12, the second transmitting module 82 includes an adding submodule 121 and a first transmitting submodule 122.

The adding submodule 121 is configured to add the first indication information into the first part of control information.

The first transmitting submodule 122 is configured to transmit the first part of control information carrying the first indication information to the control information receiving terminal through the first physical layer channel occupying the first time-frequency resource.

It can be seen from the above embodiments that when the first indication information is transmitted to the control information receiving terminal, the first indication information can be transmitted to the control information receiving terminal along with the first part of control information, so that the control information receiving terminal can obtain the first indication information from the first part of control information, determine the size of the second time-frequency resource based on the first indication information, and receive the second part of control information on the second time-frequency resource, thereby improving the accuracy of control information indication and improving the reliability that the control information receiving terminal receives the second part of control information.

Figure 13:
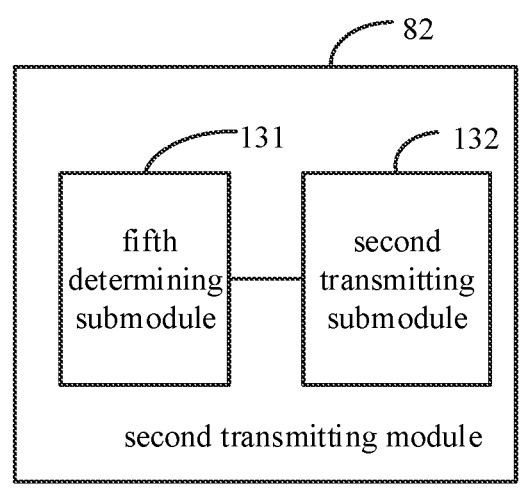
FIG. 13 is a block diagram of another device for transmitting control information according to an exemplary embodiment.

In some embodiments, based on the device in FIG. 8, as illustrated in FIG. 13, the second transmitting module 82 includes a fifth determining submodule 131 and a second transmitting submodule 132.

The fifth determining submodule 131 is configured to determine a physical layer parameter corresponding to the first indication information, different first indication information being corresponding to different physical layer parameters.

The second transmitting submodule 132 is configured to transmit the first physical layer channel that carries the first part of control information to the control information receiving terminal using the corresponding physical layer parameter.

In some embodiments, based on the device in FIG. 13, the physical layer parameter includes at least one of the following.

A demodulation reference signal (DMRS) sequence of the first physical layer channel for transmitting the first part of control information.

A transmission format used when transmitting the first part of control information.

It can be seen from the above embodiments that when the first indication information is transmitted to the control information receiving terminal, the physical layer parameter used by the first physical layer channel carrying the first part of control information can be used to implicitly indicate the first indication information. The control information transmitting terminal can determine the first indication information by detecting the physical layer parameter used by the first physical layer channel, determine the size of the second time-frequency resource based on the first indication information, and receive, on the second time-frequency resource, the second part of control information, thereby improving the flexibility of control information indication and improving the efficiency that the control information receiving terminal receives the second part of control information.

Figure 14:
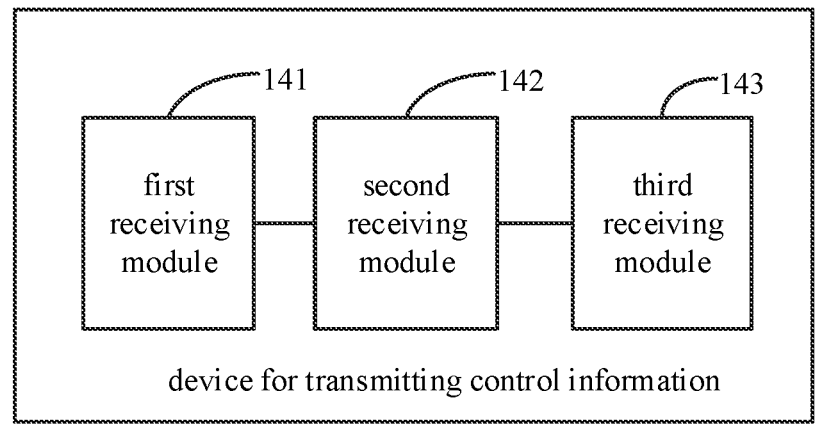
FIG. 14 is a block diagram of a device for transmitting control information according to an exemplary embodiment.

FIG. 14 is a block diagram of a device for transmitting control information according to an exemplary embodiment. The device for transmitting control information is applicable to a control information receiving terminal in sidelink communication. The control information includes a first part of control information and a second part of control information. As illustrated in FIG. 14, the device for transmitting control information can include a first receiving module 141, a second receiving module 142 and a third receiving module 143.

The first receiving module 141 is configured to receive, on a first time-frequency resource, the first part of control information from a control information transmitting terminal through a first physical layer channel.

The second receiving module 142 is configured to receive first indication information from the control information transmitting terminal, the first indication information being configured to indicate a size of a second time-frequency resource and the second time-frequency resource being configured to be occupied when transmitting the second part of control information.

The third receiving module 143 is configured to receive, on the second time-frequency resource, the second part of control information from the control information transmitting terminal through a second physical layer channel.

It can be seen from the above embodiments that the control information receiving terminal can receive, on the first time-frequency resource, the first part of control information from the control information transmitting terminal through the first physical layer channel; also receive the first indication information from the control information transmitting terminal, in which the first indication information is configured to indicate the size of the second time-frequency resource and the second time-frequency resource is configured to be occupied when transmitting the second part of control information; and receive, on the second time-frequency resource, the second part of control information from the control information transmitting terminal through the second physical layer channel. Therefore, the control information receiving terminal, without blind detection, can receive the second part of control information based on the indication of the control information transmitting terminal, reducing the complexity of blind detection and improving the communication quality of sidelink communication.

Figure 15:
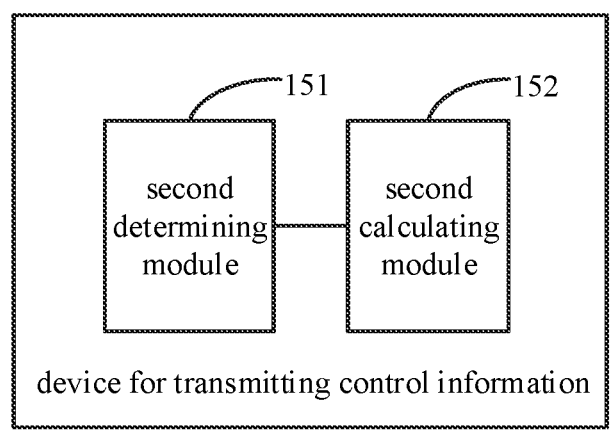
FIG. 15 is a block diagram of another device for transmitting control information according to an exemplary embodiment.

In some embodiments, based on the device in FIG. 14, as illustrated in FIG. 15, the device further includes a second determining module 151 and a second calculating module 152.

The second determining module 151 is configured to determine a value of a first parameter based on the first indication information.

The second calculating module 152 is configured to calculate the size of the second time-frequency resource based on the first parameter.

In some embodiments, based on the device in FIG. 15, the first parameter includes a modulation and coding efficiency of the second part of control information.

In some embodiments, based on the device in FIG. 15, the second physical layer channel is a physical layer channel for data transmission; and the first parameter includes a parameter for adjusting a ratio of coding efficiencies of the second part of control information and data information.

Figure 16:
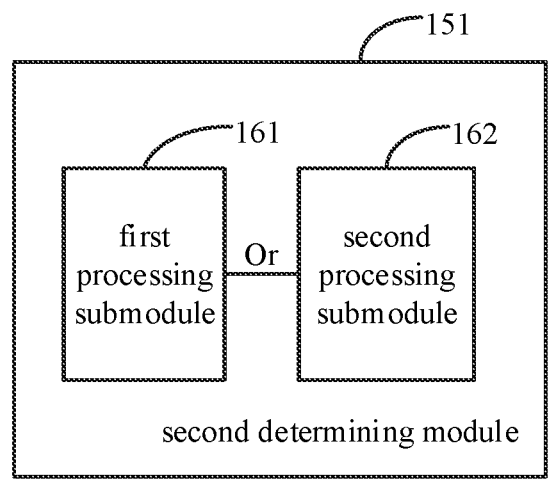
FIG. 16 is a block diagram of another device for transmitting control information according to an exemplary embodiment.

In some embodiments, based on the device in FIG. 15, as illustrated in FIG. 16, the second determining module 151 includes a first processing submodule 161 or a second processing submodule 162.

The first processing submodule 161 is configured to receive downlink signaling configuration of a base station, obtain a first mapping relationship between the value of the first parameter and the first indication information, and determine the value of the first parameter using the first mapping relationship.

The second processing submodule 162 is configured to obtain a second mapping relationship between the value of the first parameter and the first indication information in pre-configuration and determine the value of the first parameter using the second mapping relationship.

Figure 17:
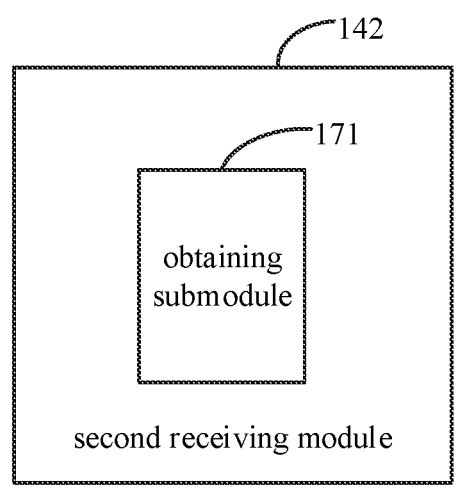
FIG. 17 is a block diagram of another device for transmitting control information according to an exemplary embodiment.

In some embodiments, based on the device in FIG. 14, as illustrated in FIG. 17, the first part of control information includes the first indication information. The second receiving module 142 includes an obtaining submodule 171.

The obtaining submodule 171 is configured to obtain the first indication information from the first part of control information.

It can be seen from the above embodiments that the first indication information can be obtained directly from the first part of control information, the size of the second time-frequency resource can be determined based on the first indication information, and the second part of control information can be received on the second time-frequency resource, thereby improving the accuracy of control information indication and improving the reliability of receiving the second part of control information.

Figure 18:
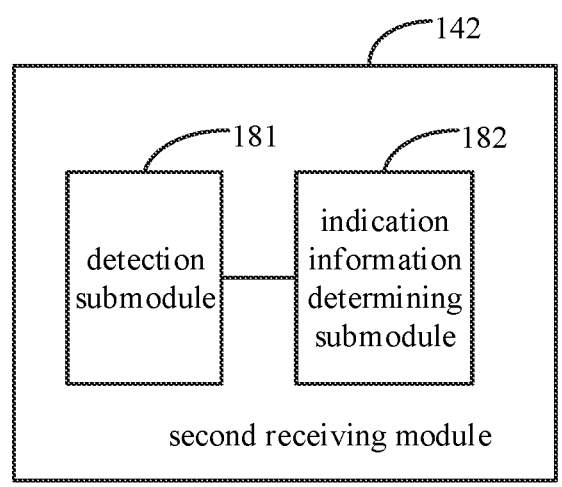
FIG. 18 is a block diagram of another device for transmitting control information according to an exemplary embodiment.

In some embodiments, based on the device in FIG. 14, as illustrated in FIG. 18, the second receiving module 142 includes a detection submodule 181 and an indication information determining submodule 182.

The detection submodule 181 is configured to detect a physical layer parameter used by the first physical layer channel carrying the first part of control information.

The indication information determining submodule 182 is configured to determine the first indication information based on the physical layer parameter used, different physical layer parameters being corresponding to different first indication information.

In some embodiments, based on the device in FIG. 18, the physical layer parameter includes at least one of the following.

A DMRS sequence of the first physical layer channel for transmitting the first part of control information.

A transmission format used when transmitting the first part of control information.

It can be seen from the above embodiments that the first indication information can be determined by detecting the physical layer parameter used by the first physical layer channel, the size of the second time-frequency resource can be determined based on the first indication information, and the second part of control information can be received on the second time-frequency resource, thereby improving the flexibility of control information indication and improving the efficiency of receiving the second part of control information.

For the device embodiments, since they correspond to the method embodiments, reference should be made to the description of the method embodiments. The device embodiments described above are merely illustrative. The units described above as separate components may or may not be physically separated and the components displayed as units may or may not be physical units, that is, they can be located locally in one unit or be distributed to multiple network units. Some or all of the modules can be selected according to actual needs to achieve the objectives of the solutions of the disclosure. Those of ordinary skill in the art can understand and implement without creative work.

The disclosure further provides a non-transitory computer-readable storage medium. The non-transitory computer-readable storage medium has stored therein a computer program. The computer program is configured to perform the method for transmitting control information as illustrated in FIG. 1 to FIG. 4.

The disclosure further provides a non-transitory computer-readable storage medium. The non-transitory computer-readable storage medium has stored therein a computer program. The computer program is configured to perform the method for transmitting control information as illustrated in FIG. 5 to FIG. 7.

The disclosure further provides a device for transmitting control information, for a control information transmitting terminal. The control information includes a first part of control information and a second part of control information.

The device includes a processor; and a memory for storing instructions executable by the processor.

The processor is configured to perform the following.

The first part of control information is transmitted to a control information receiving terminal through a first physical layer channel occupying a first time-frequency resource.

First indication information is transmitted to the control information receiving terminal, the first indication information being configured to indicate a size of a second time-frequency resource and the second time-frequency resource being configured to be occupied when transmitting the second part of control information.

The second part of control information is transmitted to the control information receiving terminal through a second physical layer channel occupying the second time-frequency resource.

Figure 19:
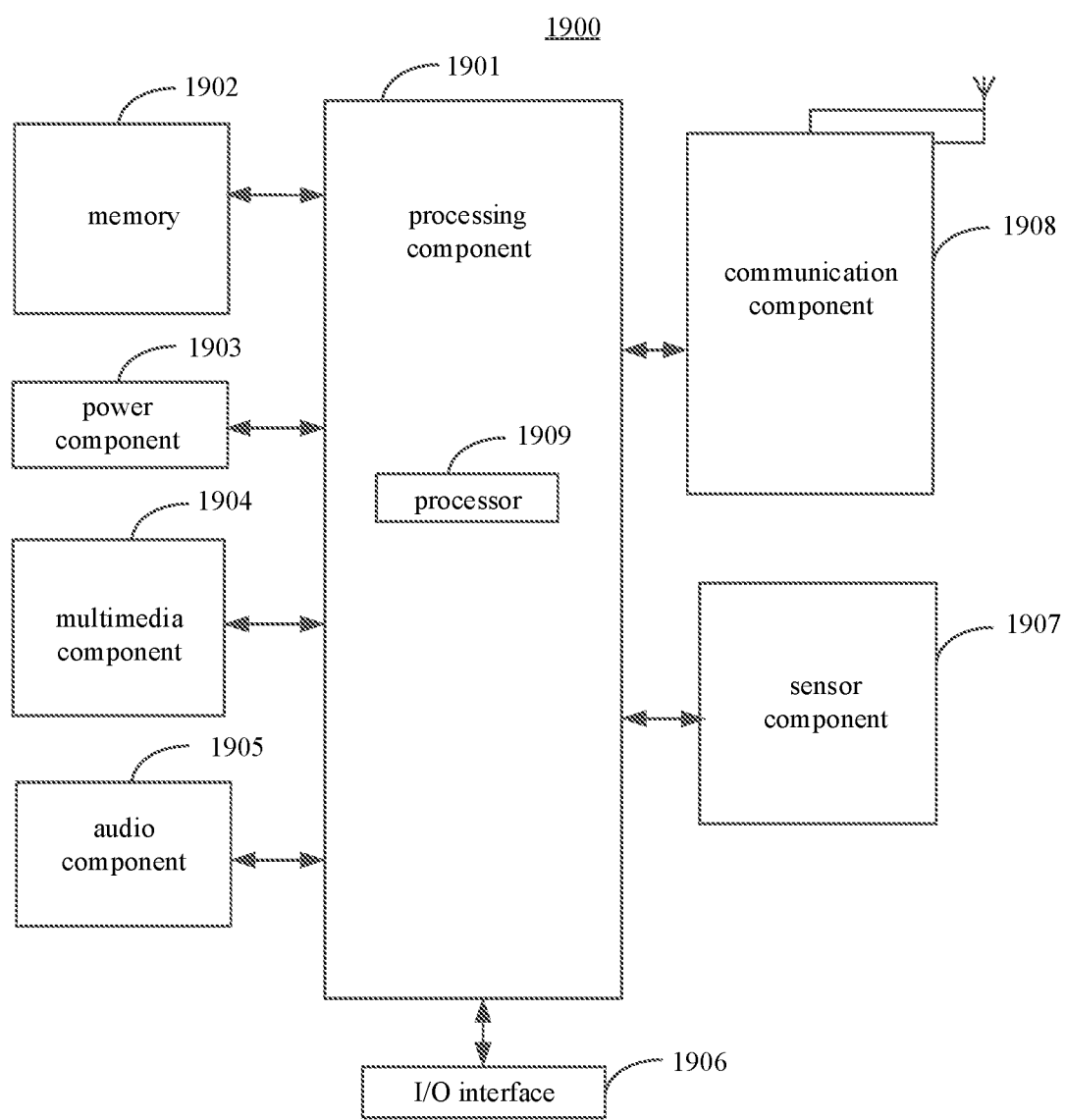
FIG. 19 is a schematic diagram of another device for transmitting control information according to an exemplary embodiment.

FIG. 19 is a schematic diagram of a device for transmitting control information according to an exemplary embodiment. The device 1900 can be provided as a control information transmitting terminal. As illustrated in FIG. 19, according to an exemplary embodiment, a device 1900 for configuring a sidelink connection resource is illustrated. The device 1900 can be a computer, a mobile phone, a digital broadcasting terminal, a messaging device, a game console, a tablet device, a medical device, exercise equipment, a personal digital assistant, and the like.

As illustrated in FIG. 19, the device 1900 can include one or more of the following components: a processing component 1901, a memory 1902, a power component 1903, a multimedia component 1904, an audio component 1905, an input/output (I/O) interface 1906, a sensor component 1907, and a communication component 1908.

The processing component 1901 typically controls overall operations of the device 1900, such as the operations associated with display, telephone calls, data communications, camera operations, and recording operations. The processing component 1901 can include one or more processors 1909 to execute instructions to perform all or part of the actions in the above described methods. Moreover, the processing component 1901 can include one or more modules which facilitate the interaction between the processing component 1901 and other components. For instance, the processing component 1901 can include a multimedia module to facilitate the interaction between the multimedia component 1904 and the processing component 1901.

The memory 1902 is configured to store various types of data to support the operation of the device 1900. Examples of such data include instructions for any applications or methods operated on the device 1900, contact data, phonebook data, messages, pictures, video, etc. The memory 1902 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1903 provides power to various components of the device 1900. The power component 1903 can include a power management system, one or more power sources, and any other components associated with the generation, management, and distribution of power in the device 1900.

The multimedia component 1904 includes a screen providing an output interface between the device 1900 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 1904 includes a front-facing camera and/or a rear-facing camera. When the device 1900 is in an operating mode, such as a shooting mode or a video mode, the front-facing camera and/or the rear-facing camera can receive external multimedia data. Each front-facing camera and rear-facing camera can be a fixed optical lens system or has focal length and optical zoom capability.

The audio component 1905 is configured to output and/or input audio signals. For example, the audio component 1905 includes a microphone (MIC) configured to receive an external audio signal when the device 1900 is in an operation mode, such as a call mode, a recording mode, and a voice recognition mode. The received audio signal can be further stored in the memory 1902 or transmitted via the communication component 1908. In some embodiments, the audio component 1905 further includes a speaker to output audio signals.

The I/O interface 1906 provides an interface between the processing component 1901 and peripheral interface modules, such as a keyboard, a click wheel, buttons, and the like. The buttons can include, but are not limited to, a home button, a volume button, a starting button, and a locking button.

The sensor component 1907 includes one or more sensors to provide status assessments of various aspects of the device 1900. For instance, the sensor component 1907 can detect an open/closed status of the device 1900, relative positioning of components, e.g., the display and the keypad, of the device 1900, a change in position of the device 1900 or a component of the device 1900, a presence or absence of user contact with the device 1900, an orientation or an acceleration/deceleration of the device 1900, and a change in temperature of the device 1900. The sensor component 1907 can include a proximity sensor configured to detect the presence of nearby objects without any physical contact. The sensor component 1907 can also include a light sensor, such as a CMOS or CCD image sensor, for use in imaging applications. In some embodiments, the sensor component 1907 can also include an accelerometer sensor, a gyroscope sensor, a magnetic sensor, a pressure sensor, or a temperature sensor.

The communication component 1908 is configured to facilitate communication, wired or wirelessly, between the device 1900 and other devices. The device 1900 can access a wireless network based on a communication standard, such as Wi-Fi, 2G, or 3G, or a combination thereof. In an exemplary embodiment, the communication component 1908 receives a broadcast signal or broadcast associated information from an external broadcast management system via a broadcast channel. In an exemplary embodiment, the communication component 1908 further includes a near field communication (NFC) module to facilitate short-range communication. For example, the NFC module can be implemented based on a radio frequency identity (RFID) technology, an infrared data association (IrDA) technology, an ultra-wideband (UWB) technology, a Bluetooth (BT) technology, and other technologies.

In exemplary embodiments, the device 1900 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1902, executable by the processor 1909 in the device 1900, for performing the above methods. For example, non-transitory computer-readable storage medium can be a ROM, a RAM, a CD-ROM, a magnetic tape, a floppy disc, an optical data storage device, and the like.

When the instructions in the storage medium are executed by the processor, the device 1900 is enabled to execute any of the methods for transmitting control information described above.

The disclosure further provides a device for transmitting control information, for a control information receiving terminal. The control information includes a first part of control information and a second part of control information.

The device includes a processor; and a memory for storing instructions executable by the processor.

The processor is configured to perform the following.

The first part of control information is received, on a first time-frequency resource, from a control information transmitting terminal through a first physical layer channel.

First indication information is received from the control information transmitting terminal, the first indication information being configured to indicate a size of a second time-frequency resource and the second time-frequency resource being configured to be occupied when transmitting the second part of control information.

The second part of control information is received, on the second time-frequency resource, from the control information transmitting terminal through a second physical layer channel.

Figure 20:
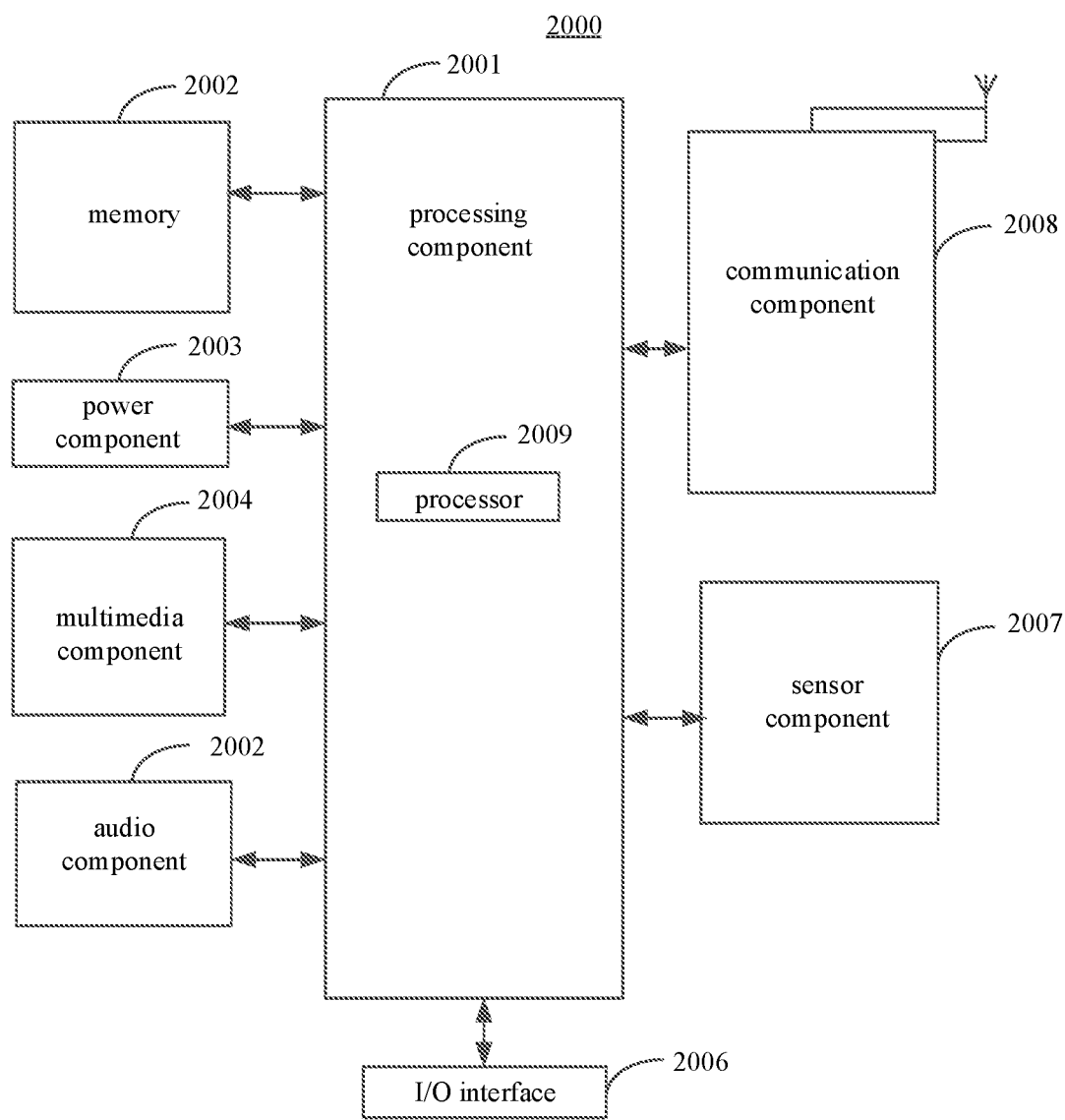
FIG. 20 is a schematic diagram of a device for transmitting control information according to an exemplary embodiment.

FIG. 20 is a schematic diagram of a device for transmitting control information according to an exemplary embodiment. The device 2000 can be provided as a control information receiving terminal. As illustrated in FIG. 20, according to an exemplary embodiment, a device 2000 for configuring a sidelink connection resource is illustrated. The device 2000 can be a computer, a mobile phone, a digital broadcasting terminal, a messaging device, a game console, a tablet device, a medical device, exercise equipment, a personal digital assistant, and the like.

As illustrated in FIG. 20, the device 2000 can include one or more of the following components: a processing component 2001, a memory 2002, a power component 2003, a multimedia component 2004, an audio component 2005, an input/output (I/O) interface 2006, a sensor component 2007, and a communication component 2008.

The processing component 2001 typically controls overall operations of the device 2000, such as the operations associated with display, telephone calls, data communications, camera operations, and recording operations. The processing component 2001 can include one or more processors 2009 to execute instructions to perform all or part of the actions in the above described methods. Moreover, the processing component 2001 can include one or more modules which facilitate the interaction between the processing component 2001 and other components. For instance, the processing component 2001 can include a multimedia module to facilitate the interaction between the multimedia component 2004 and the processing component 2001.

The memory 2002 is configured to store various types of data to support the operation of the device 2000. Examples of such data include instructions for any applications or methods operated on the device 2000, contact data, phonebook data, messages, pictures, video, etc. The memory 2002 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2003 provides power to various components of the device 2000. The power component 2003 can include a power management system, one or more power sources, and any other components associated with the generation, management, and distribution of power in the device 2000.

The multimedia component 2004 includes a screen providing an output interface between the device 2000 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 2004 includes a front-facing camera and/or a rear-facing camera. When the device 2000 is in an operating mode, such as a shooting mode or a video mode, the front-facing camera and/or the rear-facing camera can receive external multimedia data. Each front-facing camera and rear-facing camera can be a fixed optical lens system or has focal length and optical zoom capability.

The audio component 2005 is configured to output and/or input audio signals. For example, the audio component 2005 includes a microphone (MIC) configured to receive an external audio signal when the device 2000 is in an operation mode, such as a call mode, a recording mode, and a voice recognition mode. The received audio signal can be further stored in the memory 2002 or transmitted via the communication component 2008. In some embodiments, the audio component 1905 further includes a speaker to output audio signals.

The I/O interface 2006 provides an interface between the processing component 2001 and peripheral interface modules, such as a keyboard, a click wheel, buttons, and the like. The buttons can include, but are not limited to, a home button, a volume button, a starting button, and a locking button.

The sensor component 2007 includes one or more sensors to provide status assessments of various aspects of the device 2000. For instance, the sensor component 2007 can detect an open/closed status of the device 2000, relative positioning of components, e.g., the display and the keypad, of the device 2000, a change in position of the device 2000 or a component of the device 2000, a presence or absence of user contact with the device 2000, an orientation or an acceleration/deceleration of the device 2000, and a change in temperature of the device 2000. The sensor component 2007 can include a proximity sensor configured to detect the presence of nearby objects without any physical contact. The sensor component 2007 can also include a light sensor, such as a CMOS or CCD image sensor, for use in imaging applications. In some embodiments, the sensor component 2007 can also include an accelerometer sensor, a gyroscope sensor, a magnetic sensor, a pressure sensor, or a temperature sensor.

The communication component 2008 is configured to facilitate communication, wired or wirelessly, between the device 2000 and other devices. The device 2000 can access a wireless network based on a communication standard, such as Wi-Fi, 2G, or 3G, or a combination thereof. In an exemplary embodiment, the communication component 2008 receives a broadcast signal or broadcast associated information from an external broadcast management system via a broadcast channel. In an exemplary embodiment, the communication component 2008 further includes a near field communication (NFC) module to facilitate short-range communication. For example, the NFC module can be implemented based on a radio frequency identity (RFID) technology, an infrared data association (IrDA) technology, an ultra-wideband (UWB) technology, a Bluetooth (BT) technology, and other technologies.

In exemplary embodiments, the device 2000 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 2002, executable by the processor 2009 in the device 2000, for performing the above methods. For example, non-transitory computer-readable storage medium can be a ROM, a RAM, a CD-ROM, a magnetic tape, a floppy disc, an optical data storage device, and the like.

When the instructions in the storage medium are executed by the processor, the device 2000 is enabled to execute any of the methods for transmitting control information described above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting control information, for a control information transmitting terminal, the control information comprising a first part of control information and a second part of control information; the method comprising:
    transmitting the first part of control information to a control information receiving terminal through a first physical layer channel occupying a first time-frequency resource;
    transmitting first indication information to the control information receiving terminal, the first indication information being configured to indicate a size of a second time-frequency resource and the second time-frequency resource being configured to be occupied when transmitting the second part of control information; and
    transmitting the second part of control information to the control information receiving terminal through a second physical layer channel occupying the second time-frequency resource,
    wherein the method further comprises:
    calculating the size of the second time-frequency resource based on a first parameter; and
    determining the first indication information based on a value of the first parameter,
    wherein the second physical layer channel is a physical layer channel for data transmission; and the first parameter includes a parameter for adjusting a ratio of coding efficiencies of the second part of control information and data information.

2. The method as claimed in claim 1, wherein transmitting the first indication information to the control information receiving terminal comprises:
    adding the first indication information into the first part of control information; and
    transmitting the first part of control information carrying the first indication information to the control information receiving terminal through the first physical layer channel occupying the first time-frequency resource.

3. The method as claimed in claim 1, wherein transmitting the first indication information to the control information receiving terminal comprises:
    determining a physical layer parameter corresponding to the first indication information, wherein different first indication information correspond to different physical layer parameters; and
    transmitting the first physical layer channel that carries the first part of control information to the control information receiving terminal using the corresponding physical layer parameter.

4. The method as claimed in claim 3, wherein the physical layer parameter comprises at least one of:
    a demodulation reference signal (DMRS) sequence of the first physical layer channel for transmitting the first part of control information; and
    a transmission format used when transmitting the first part of control information.

5. A method for transmitting control information, for a control information receiving terminal, the control information comprising a first part of control information and a second part of control information; the method comprising:
    receiving, on a first time-frequency resource, the first part of control information from a control information transmitting terminal through a first physical layer channel;
    receiving first indication information from the control information transmitting terminal, the first indication information being configured to indicate a size of a second time-frequency resource and the second time-frequency resource being configured to be occupied when transmitting the second part of control information; and
    receiving, on the second time-frequency resource, the second part of control information from the control information transmitting terminal through a second physical layer channel;
    wherein the method further comprises:
    determining a value of a first parameter based on the first indication information; and
    calculating the size of the second time-frequency resource based on the first parameter,
    wherein the second physical layer channel is a physical layer channel for data transmission; and the first parameter includes a parameter for adjusting a ratio of coding efficiencies of the second part of control information and data information.

6. The method as claimed in claim 5, wherein the first part of control information comprises the first indication information; and
    receiving the first indication information from the control information transmitting terminal comprises:
    obtaining the first indication information from the first part of control information.

7. The method as claimed in claim 5, wherein receiving the first indication information from the control information transmitting terminal comprises:
    detecting a physical layer parameter used by the first physical layer channel carrying the first part of control information; and
    determining the first indication information based on the physical layer parameter used, wherein different physical layer parameters correspond to different first indication information.

8. The method as claimed in claim 7, wherein the physical layer parameter comprises at least one of:
    a demodulation reference signal (DMRS) sequence of the first physical layer channel for transmitting the first part of control information; and
    a transmission format used when transmitting the first part of control information.

9. A device for transmitting control information, for a control information transmitting terminal, the control information comprising a first part of control information and a second part of control information; the device comprising:
a processor; and
a memory for storing instructions executable by the processor;
wherein the processor is configured to:
transmit the first part of control information to a control information receiving terminal through a first physical layer channel occupying a first time-frequency resource;
transmit first indication information to the control information receiving terminal, the first indication information being configured to indicate a size of a second time-frequency resource and the second time-frequency resource being configured to be occupied when transmitting the second part of control information; and
transmit the second part of control information to the control information receiving terminal through a second physical layer channel occupying the second time-frequency resource,
wherein the processor is further configured to:
calculate the size of the second time-frequency resource based on a first parameter; and
determine the first indication information based on a value of the first parameter,
wherein the second physical layer channel is a physical layer channel for data transmission; and the first parameter includes a parameter for adjusting a ratio of coding efficiencies of the second part of control information and data information.

10. A device for transmitting control information, for a control information receiving terminal, the control information comprising a first part of control information and a second part of control information; the device comprising:
a processor; and
a memory for storing instructions executable by the processor;
wherein the processor is configured to:
receive, on a first time-frequency resource, the first part of control information from a control information transmitting terminal through a first physical layer channel;
receive first indication information from the control information transmitting terminal, the first indication information being configured to indicate a size of a second time-frequency resource and the second time-frequency resource being configured to be occupied when transmitting the second part of control information; and
receive, on the second time-frequency resource, the second part of control information from the control information transmitting terminal through a second physical layer channel,
wherein the processor is further configured to:
determine a value of a first parameter based on the first indication information; and
calculate the size of the second time-frequency resource based on the first parameter,
wherein the second physical layer channel is a physical layer channel for data transmission; and the first parameter includes a parameter for adjusting a ratio of coding efficiencies of the second part of control information and data information.

11. The method as claimed in claim 1, wherein the first physical layer channel is physical sidelink control channel (PSCCH); the second physical layer channel is physical sidelink shared channel (PSSCH).

12. The method as claimed in claim 1, wherein the control information transmitting terminal connects with the control information receiving terminal through sidelink.

13. The method as claimed in claim 1, wherein the second part of control information comprises hybrid automatic repeat request (HARQ) related information.

14. The method as claimed in claim 5, wherein the first physical layer channel is physical sidelink control channel (PSCCH); the second physical layer channel is physical sidelink shared channel (PSSCH).

15. The method as claimed in claim 5, wherein the control information transmitting terminal connects with the control information receiving terminal through sidelink.

16. The method as claimed in claim 5, wherein the second part of control information comprises hybrid automatic repeat request (HARQ) related information.

17. The method as claimed in claim 1, wherein determining the first indication information based on the value of the first parameter comprises:
receiving downlink signaling configuration of a base station and determining the first indication information using the value of the first parameter indicated in the downlink signaling configuration,
or, determining the first indication information using the value of the first parameter indicated in pre-configuration.

18. The method as claimed in claim 1, wherein determining the first indication information based on the value of the first parameter, comprises:
receiving downlink signaling configuration of a base station, obtaining a first mapping relationship between the value of the first parameter and the first indication information, and determining the first indication information using the first mapping relationship,
or, obtaining a second mapping relationship between the value of the first parameter and the first indication information in pre-configuration and determining the first indication information using the second mapping relationship.

* * * * *